United States Patent
Dua et al.

(10) Patent No.: US 9,794,766 B2
(45) Date of Patent: *Oct. 17, 2017

(54) IDENTIFYING AN ENTITY ASSOCIATED WITH WIRELESS NETWORK ACCESS POINT

(71) Applicant: Google Inc., Mountain View, CA (US)

(72) Inventors: Robin Dua, San Francisco, CA (US); Alexander Fabrikant, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,715

(22) Filed: Jan. 18, 2016

(65) Prior Publication Data

US 2016/0135034 A1 May 12, 2016

Related U.S. Application Data

(63) Continuation of application No. 14/136,264, filed on Dec. 20, 2013, now Pat. No. 9,241,252.

(51) Int. Cl.
| | |
|---|---|
| H04W 8/00 | (2009.01) |
| H04W 64/00 | (2009.01) |
| H04L 29/08 | (2006.01) |
| H04W 4/02 | (2009.01) |
| H04W 48/16 | (2009.01) |

(Continued)

(52) U.S. Cl.
CPC .......... *H04W 8/005* (2013.01); *H04L 67/18* (2013.01); *H04W 4/02* (2013.01); *H04W 4/021* (2013.01); *H04W 4/025* (2013.01); *H04W 48/16* (2013.01); *H04W 48/18* (2013.01); *H04W 64/003* (2013.01); *H04W 88/08* (2013.01)

(58) Field of Classification Search
CPC ....... H04W 4/02; H04W 8/005; H04W 4/021; H04W 48/16; H04L 67/18
See application file for complete search history.

(56) References Cited

U.S. PATENT DOCUMENTS

| | | | |
|---|---|---|---|
| 8,165,150 B2 | 4/2012 | Aweya et al. | |
| 8,577,392 B1 * | 11/2013 | Pai | H04L 67/18 455/404.2 |

(Continued)

OTHER PUBLICATIONS

PCT International Search Report for PCT/US2014-065402, dated Mar. 2, 2015—4 pages.

*Primary Examiner* — Khaled Kassim
*Assistant Examiner* — Syed S Ali
(74) *Attorney, Agent, or Firm* — Dority & Manning, P.A.

(57) ABSTRACT

Systems and methods for identifying an entity associated with a wireless network access point are provided. An estimated location of a wireless network access point and a network name associated with a wireless network access point can be accessed. The network name can be analyzed to identify at least one text signal. An entity associated with the wireless network access point can be identified based at least in part on the text signal. For instance, a confidence score for a plurality of candidate entities identified using the estimated location of the wireless network access point can be determined based on the text signal. The confidence score can be used to identify the entity associated with the wireless network access point. Information associated with the entity can be presented in a graphical user interface.

16 Claims, 6 Drawing Sheets

(51) Int. Cl.
*H04W 48/18* (2009.01)
*H04W 88/08* (2009.01)

(56) References Cited

U.S. PATENT DOCUMENTS

| | | | |
|---|---|---|---|
| 9,241,252 B2* | 1/2016 | Dua | H04W 4/02 |
| 2008/0032706 A1 | 2/2008 | Sheynblat et al. | |
| 2009/0102712 A1* | 4/2009 | Heffez | G06Q 20/32 |
| | | | 342/357.55 |
| 2009/0238079 A1 | 9/2009 | Gantenbein et al. | |
| 2010/0020776 A1 | 1/2010 | Youssef et al. | |
| 2011/0081918 A1* | 4/2011 | Burdo | G01C 21/20 |
| | | | 455/456.1 |
| 2011/0105226 A1* | 5/2011 | Perlman | A63F 13/12 |
| | | | 463/30 |
| 2011/0159818 A1 | 6/2011 | Scherzer et al. | |
| 2011/0319100 A1 | 12/2011 | Flanagan | |
| 2012/0058826 A1* | 3/2012 | Amaitis | G07F 17/3218 |
| | | | 463/42 |
| 2013/0006522 A1* | 1/2013 | Vellaikal | H04W 4/023 |
| | | | 701/426 |
| 2013/0165142 A1 | 6/2013 | Huang | |
| 2013/0165144 A1 | 6/2013 | Ziskind et al. | |
| 2013/0210450 A1 | 8/2013 | Kenington et al. | |
| 2013/0260797 A1 | 10/2013 | Jones et al. | |
| 2013/0267255 A1 | 10/2013 | Liu et al. | |
| 2013/0285855 A1* | 10/2013 | Dupray | G01S 19/48 |
| | | | 342/451 |
| 2015/0020195 A1* | 1/2015 | Alizadeh-Shabdiz | H04L 61/2007 |
| | | | 726/22 |
| 2015/0081860 A1* | 3/2015 | Kuehnel | H04L 41/0806 |
| | | | 709/222 |
| 2016/0239857 A1* | 8/2016 | Milton | G06Q 30/0205 |
| 2017/0078956 A1* | 3/2017 | LeBlanc | H04W 48/18 |

* cited by examiner

IDENTIFYING AN ENTITY ASSOCIATED WITH WIRELESS NETWORK ACCESS POINT

PRIORITY CLAIM

The present application is a continuation of U.S. application Ser. No. 14/136,264, having a filing date of Dec. 20, 2013. Applicants claim priority to and benefit of all such applications and incorporate all such applications herein by reference.

FIELD

The present disclosure relates generally to identifying entities associated with wireless network access points.

BACKGROUND

Electronic devices, such as smartphones, tablets, mobile phones, wearable computing devices, and other electronic devices, can scan for available wireless network access points (e.g. Wi-Fi hotspots) for connection to a network, such as the Internet. An electronic device can provide for display a user interface presenting the available wireless network access points for connection by the electronic device. The user can then interact with the user interface to connect with wireless network access point. At a given location, an electronic device can see many different wireless network access points. In some cases, it can be difficult to determine the entity or establishment with which the wireless network access point is associated.

Location-based services can leverage the physical location of an electronic device to provide an enhanced service or experience for a user. A location-based service can use one of several techniques for determining the position of an electronic device. For instance, signal strength of various wireless network access points detected by an electronic device can be used to determine the location of an electronic device. The location of the electronic device and other information can optionally be used to provide personalized applications and services.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of identifying an entity associated with a wireless network access point. The method includes accessing, by one or more computing devices, an estimated location of a wireless network access point and accessing, by the one or more computing devices, a network name associated with the wireless network access point. The method further includes analyzing, by the one or more computing devices, the network name to identify at least one text signal and identifying, by the one or more computing devices, an entity associated with the wireless network access point based at least in part on the text signal and the estimated location of the wireless network access point. The method further includes providing, by the one or more computing devices, information associated with the entity for display in a graphical user interface.

Other aspects of the present disclosure are directed to systems, apparatus, tangible non-transitory computer-readable media, user interfaces and devices for identifying an entity associated with a wireless network access point.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
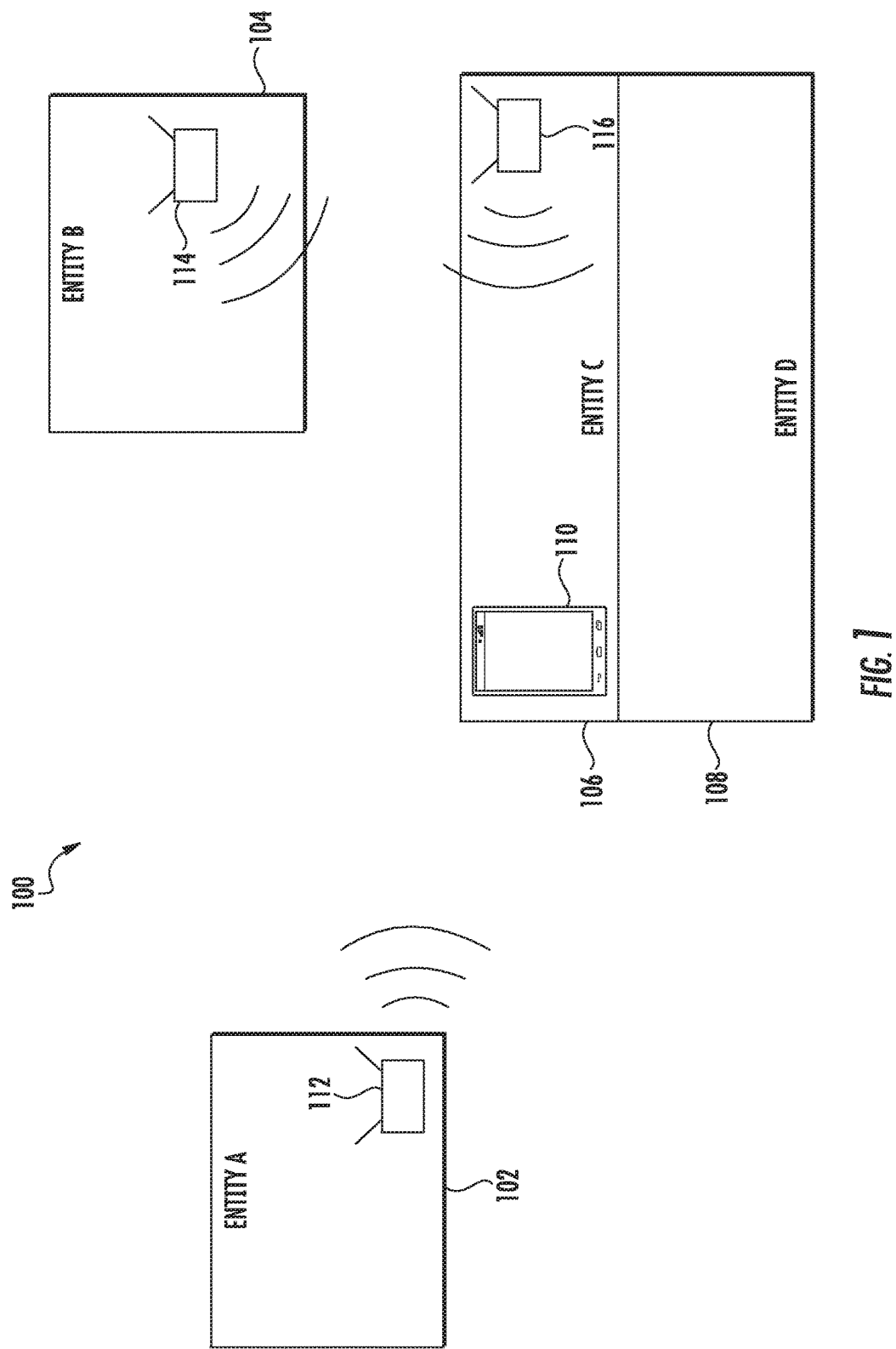
FIG. 1 depicts an example representation of detected wireless network access points by an electronic device.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to identifying entities, such as local businesses, restaurants, café s, museums, establishments, and other entities, associated with wireless network access points (e.g. Wi-Fi access points) detectable by electronic devices. Good approximations of the locations of wireless network access points can be difficult to obtain. For example, approximations of wireless network access point locations can be determined based on satellite positioning information (e.g. GPS data) and wireless network access point data (e.g. connection data and signal strength). These approximations can be of low quality in areas where satellite positioning information quality is low, such as in indoor environments. In addition, these approximations may not provide semantic information naming the entity with which the wireless network access point is associated.

Many entities set a network name (e.g. SSID) associated with their wireless network access point in a way that makes it readily apparent to a user that the wireless network access point belongs to a particular entity. For instance, an entity named Café Intermezzo can set the network name for its wireless network access point as "Intermezzo WiFi." According to example aspects of the present disclosure, network names can be analyzed using various text analysis techniques (e.g. tokenization techniques) to recognize wireless network access points belonging to entities with high confidence. Once the entity associated with a wireless access point is known, the entity information can be provided to the user. For instance, information associated with the entity can be provided for display in a graphical user interface to the user. The information can be semantic information naming the entity associated with the wireless network access point. In addition, user device connections to the wireless network access point can be used, for instance, to provide a strong signal indicative of the location of the user device.

More particularly, data identifying a wireless network access point can be accessed, for instance, by an electronic device (e.g. smartphone, tablet, mobile phone, wearable computing device, etc.) detecting the wireless network access point. The data identifying the wireless network access point can include a network name (e.g. SSID) associated with the wireless network access point. An estimated location of the wireless network access point can be obtained from, for instance, position data associated with an electronic device detecting the wireless network access point and/or signal strength of the wireless network access point and other wireless network access points detected by the electronic device. The estimated location of the wireless network access point in combination with the network name can be used to reliably identify the entity associated with the wireless network access point.

For instance, a database of entity information that links entities to geographic locations (e.g. a geographic information system database) can be accessed. For each wireless network access point, a set of candidate entities can be determined based on the estimated location of the wireless network access point. For example, the set of candidate entities can be the set of entities that are located within a defined radius of the estimated location of the wireless network access point. In particular example implementations, the size of the radius can be defined as a function of, for instance, an uncertainty associated with the estimated location of the wireless network access point, an uncertainty associated with an entity's location in a database of entity information, and an estimated range of the wireless network access point.

A confidence score can be determined for each of the candidate entities. The confidence score for a candidate entity can be indicative of how likely the wireless network access point is associated with the candidate entity. The candidate entity having the highest confidence score and/or a confidence score that exceeds a threshold can be identified as associated with the wireless network access point. For instance, if entity A has a confidence score of 0.85 and entity B has a confidence score of 0.64, the entity A can be identified as associated with the wireless network access point.

According to example aspects of the present disclosure, the confidence score for each candidate entity can be determined based at least in part on the network name associated with the wireless network access point using a scoring function. More particularly, the network name can be analyzed using textual analysis techniques to identify one or more text signals or tokens. The scoring function can determine a confidence score based on the text signals. For example, the scoring function can provide a confidence score by matching text signals with at least a portion of an entity name or other text or information associated with an entity (e.g. address, website, phone number, etc.). Each match between a text signal and at least a portion of the entity name or other information associated with the entity can be weighted and used to calculate the confidence score.

The scoring function can take into account other parameters in determining the confidence score, including, but not limited to, popularity of text signals in network names both regionally and nationally, complexity of the text signals, such as the length of the signal token, distance between the estimated location of the wireless network access point and the location of the entity, signals indicative of the user being present at the entity at the time of detection of the wireless network access point (e.g. the user check in at the entity using social media), the location of other wireless network access points, and other factors.

The reliable identification of entities associated with wireless network access points can be used for a variety of purposes. For example, the identified entity can be used to provide information associated with that entity such as its official name, phone number, or business hours, in association with the wireless network access points in a graphical user interface. This can help the user in determining whether to connect to a particular wireless network. For instance, a user at Café Intermezzo can desire to connect to the wireless network access point associated with Café Intermezzo as opposed to a different nearby wireless network access point associated with a different entity. The graphical user interface can provide information indicating that a particular network is associated with Café Intermezzo so that the user can more easily connect to the proper wireless network access point.

As another example, when a user connects to a wireless network access point associated with an entity identified according to example aspects of the present disclosure, this can be provide a very reliable signal that the user was located at the entity in a location-based services platform. This signal can be used for a variety of purposes, such as for location-based services optionally requested by the user or to be used as training data for a model used to identify user device locations based at least in part on proximity to wireless network access points.

Various embodiments discussed herein may access and analyze personal information about users and/or entities, or make use of personal information or entity information, such as wireless network access point information, user device location information, user connection information, and other information. In situations in which the systems and methods discussed herein access and analyze information about users or entities, or make use of such information, the users and entities may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how such information is collected and used by the application or system. In addition, certain information or data can be treated in one or more ways before it is stored or used, so that personally identifiable information is removed. For example, a user's identity may be treated so that no personally identifiable information can be determined for the user.

Example Identification of Entity Associated with Wireless Network Access Point

FIG. 1 depicts an example representation of a plurality of wireless network access points detected by an electronic device. More particularly, a user carrying an electronic device 110 (e.g. a smartphone, tablet, wearable computing device, display with one or more processors, etc.) can be located in a geographic area 100. A variety of entities can be located in the geographic area 100. For instance, entity A 102, entity B 104, entity C, 106, and entity D 108 can be located in the geographic area 100. Each of the entities 102, 104, 106, and 108 can be a different entity, such as a business, restaurant, building, park, café, or other entity or establishment. Each of the entities 102, 104, 106, and 108 can have its own associated premises or locale. In the example of FIG. 1, the electronic device 110 is located at a premises or locale associated with Entity C 106.

The electronic device 110 can be configured to scan for wireless network access points in the area proximate the electronic device 110. In the example of FIG. 1, the electronic device 110 can detect a first wireless network access point 112, a second wireless network access point 114, and a third wireless network access point 116. The wireless network access point 112 can be associated with entity A 102. The wireless network access point 114 can be associated with entity B 104. The wireless network access point 116 can be associated with entity C 106. The wireless network access points 112, 114, and 116 can allow the electronic device 110 to connect wirelessly to a network, such as the Internet. The wireless network access points 112, 114, and 116 can be any suitable wireless network access point, such as a WiFi hotspot, Bluetooth connection, or other suitable wireless network access point.

The approximate locations of the wireless network access points 112, 114, and 116 can be known. For instance, the approximate locations of the wireless network access points 112, 114, and 116 can be known from previously determined geolocation information, for instance, provided by owners of the wireless network access points. As another example, the location of the wireless network access points can be estimated, for instance, based on the estimated location of the electronic device 110 as determined by a positioning system (e.g. a GPS system) and the detected signal strength of the wireless network access points 112, 114, and 116 at the electronic device 110.

While the approximate locations of the wireless network access points 112, 114, and 116 may be known, it can be difficult to determine the exact entity to which each wireless network access point belongs. For instance, a user associated with electronic device 110 can desire to connect to the wireless network access point 116 associated with entity C 106 because the user is located at entity C 106. The electronic device 110, however, can detect three wireless network access points 112, 114, and 116. According to example aspects of the present disclosure, the entity associated with one or more of the wireless network access points 112, 114, and 116 can be identified with high confidence by analyzing the network name associated with the wireless network access points 112, 114, 116. Information associated with the identified entity can be displayed in a graphical user interface on the electronic device 110 to assist the user, for instance, in identifying which wireless network access point to connect and in identifying, for instance, a semantic location (e.g. name of the entity) where the user is currently located.

Figure 2:
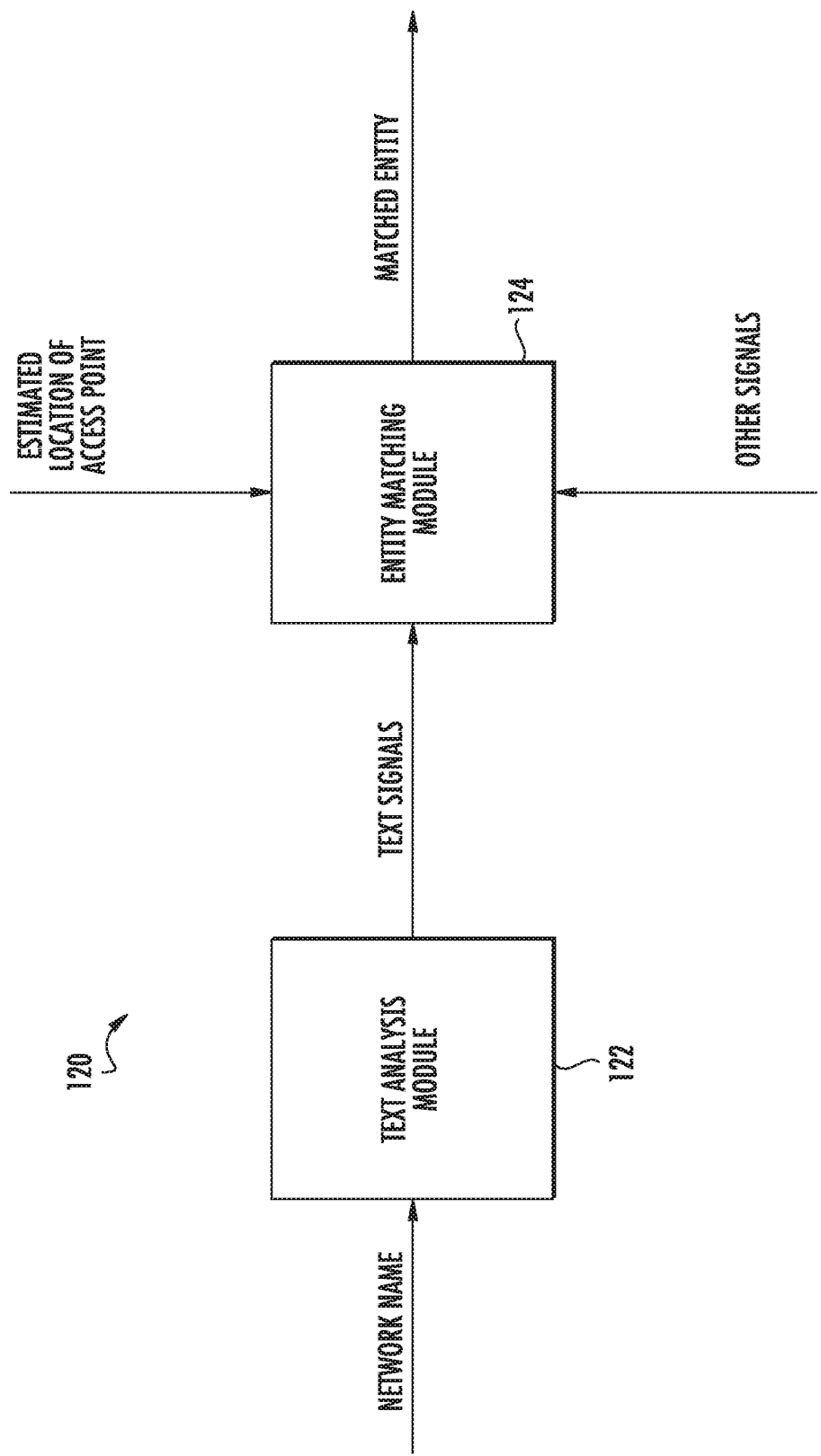
FIG. 2 depicts an example system for identifying an entity associated with a wireless network access point according to example embodiments of the present disclosure.

FIG. 2 depicts an overview of an example system 120 for identifying an entity associated with a wireless network access point based on a network name associated with the wireless network access point according to an example embodiment of the present disclosure. The system 120 can include a text analysis module 122 and an entity matching module 124. The text analysis module 122 and the entity matching module 124 can be implemented on one or more processors of one or more computing devices, such as the electronic device 110 of FIG. 1, one or more of the computing devices of FIG. 7, or other suitable computing device(s).

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible non-transitory computer-readable storage medium such as RAM, hard disk or optical or magnetic media. When software is used, any suitable programming language or platform can be used to implement the module.

The text analysis module 122 can access data indicative of the network name of a wireless network access point. The text analysis module 122 can be configured to analyze the network name of the wireless network access point using various text analysis techniques (e.g. tokenization techniques) to identify one or more text signals or tokens from the network name. Example techniques for analyzing a network name to identify one or more text signals will be discussed in more detail below.

The text analysis module 122 can be configured to provide the one or more text signals to the entity matching module 124. The entity matching module 124 can be configured to access information such as the estimated location of the access point and other signals to match an entity with the wireless network access point. The matched entity can be provided as an output of the system 120. Information associated with the matched entity (e.g. such as the official name, phone number, business hours, etc.) can then be, for instance, provided for display in a graphical user interface, such as a graphical user interface, presented on a display of the electronic device 110 of FIG. 1. The information associated with the matched entity can be useful in assisting the user in identifying a wireless network access point for connection. In addition, if the user connects to the wireless network access point, this can be a reliable signal indicative of the user being present at the entity matched with the wireless network access point. This can be used, for instance, to provide information to the user based on the user's semantic location.

Figure 3:
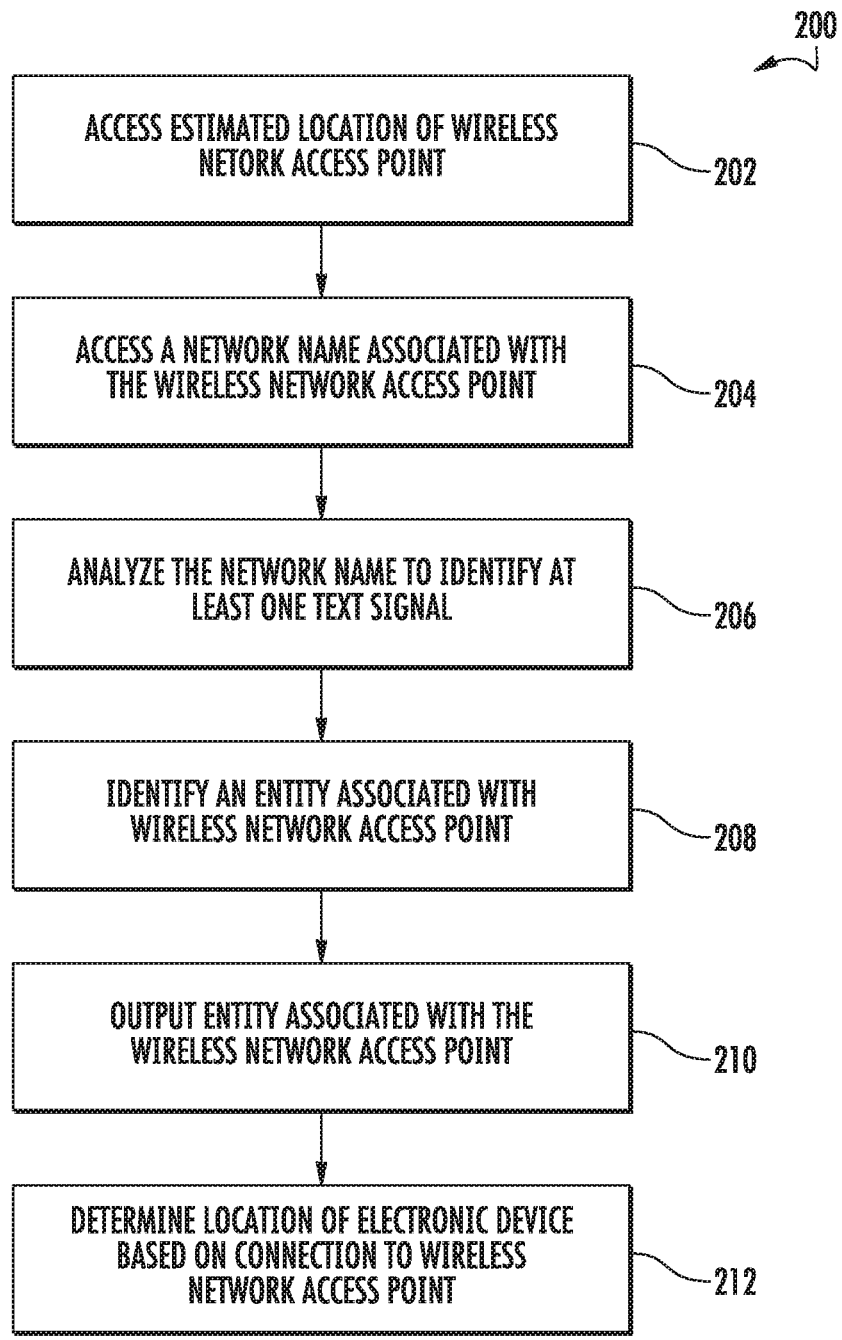
FIG. 3 depicts an example method for identifying an entity associated with a wireless network access point according to example embodiments of the present disclosure.

Example Methods for Identifying an Entity Associated with a Wireless Network Access Point FIG. 3 depicts a flow diagram of an example method (200) for identifying an entity associated with a wireless network access point according to example embodiments of the present disclosure. The method (200) can be implemented by one or more computing devices, such as one or more of the computing devices depicted in FIG. 7. In addition, FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, expanded, or modified in various ways without deviating from the scope of the present disclosure.

At (202), the method includes accessing an estimated location of a wireless network access point. Accessing the estimated location of the wireless network access point can include accessing previously determined estimated location information stored, for instance, in a memory and/or can include determining an estimated location of a wireless network access point, for instance, based at least in part on signal strength of the wireless network access point. The estimated location of the wireless network access point can have a degree of uncertainty. For instance, the estimated location can have an uncertainty of 1 km relative to the actual location of the wireless network access point.

At (204), the method includes accessing a network name associated with the wireless network access point. More particularly, wireless network access points can broadcast a network name (e.g. SSID) that is detectable by electronic devices. The network name can include a text string having a plurality of characters. Accessing a network name can include obtaining a network name for the wireless network access point, for instance, provided by an owner of the wireless network access point and stored in a memory or can also include detecting a network name broadcast by the wireless network access point.

At (206), the method can include analyzing the network name to identify at least one text signal. As used herein, a text signal can refer to a token (e.g. a set of one or more characters that form words, phrases, symbols or other meaningful elements) derived from at least portion of the network name. The network name can be analyzed to identify one or more text signals using a variety of textual analysis techniques. For instance, in one particular implementation, the text signals can be identified using one or more generic tokenization techniques for a particular language. For instance, tokenization can be performed based on spacing and punctuation marks for network names in the English language. For network names in other languages, such as polysynthetic languages or orthographies without word spacing, other more advanced tokenization techniques can be used to tokenize a network name into one or more text signals.

Other techniques can be used to identify text signals from the network name. For instance, text signals can be identified based on boundaries between character classes. As an example, [cafe] and [123] can be identified as relevant text signals from the network name "Cafe123." Text signals can also be identified based at least in part on upper/lower case distinctions in the network name. For instance, BobsCafe can be tokenized into [Bobs] and [Cafe] and/or [bobs cafe]. In particular implementations, a generic n-gram model for likely word boundaries in a language can be used to identify text signals.

According to a particular embodiment of the present disclosure, the text signals can be filtered based on a corpus of default network names and default name patterns to remove text signals associated with common network names that are unlikely to carry entity information. For instance, text signals such as [default], [NETGEAR], [2Wire] can be filtered as these text signals are unlikely to provide much information about the entity associated with the wireless network access point.

At (208), the method includes identifying an entity associated with the wireless network access point based at least in part on the one or more text signals and the estimated location of the wireless network access point. More particularly, a set of candidate entities can be identified based on the estimated location of the wireless network access point. Confidence scores can be generated for the set of candidate entities based at least in part on the text signals identified from the network name. The confidence scores can be used to rank the candidate entities and/or to select the candidate entity most likely to be associated with the wireless network access point.

Figure 4:
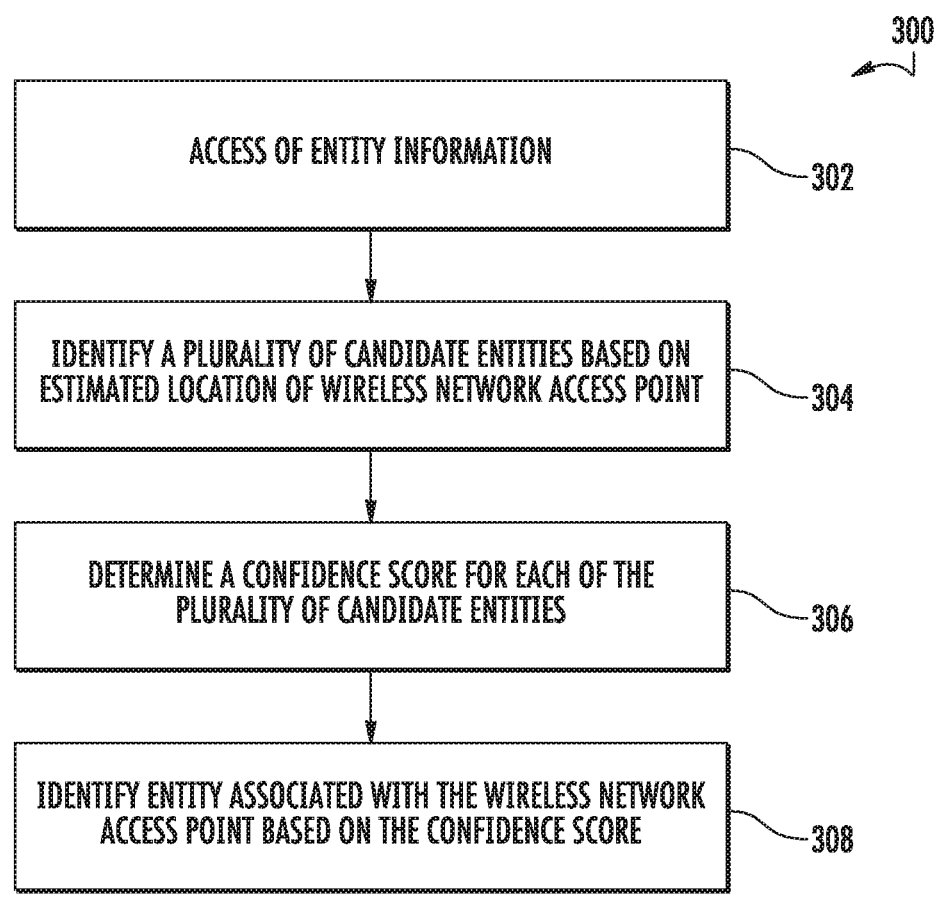
FIG. 4 depicts a flow diagram of an example method for identifying an entity associated with a wireless network access point based at least in part on a confidence score according to example embodiments of the present disclosure.

FIG. 4 depicts a flow diagram of an example method (300) for identifying an entity associated with a wireless network access point based at least in part on a confidence score according to example embodiments of the present disclosure. The method (300) can be implemented by one or more computing devices, such as one or more of the computing devices depicted in FIG. 7.

At (302) of FIG. 4, a database of entity information can be accessed. The database of entity information can link entities in a geographic area to a particular location. For instance, the database of entity information can be a database in a geographic information system that indexes information by geographic coordinates of its elements. Other suitable databases of entity information can be accessed without deviating from the scope of the present disclosure. The database of entity information can link entities to geographic locations with degree of uncertainty. For instance, the locations of entities provided by the database of entity information can be accurate to within a degree of uncertainty associated with the database of entity information.

The database of entity information can be accessed, for instance, from a remote computing device such as a web server associated with a geographic information system. The database of entity information can also be stored locally on a client device. In one example implementation, a regional dataset can be fetched from a remote device and stored locally at a client device. The information can then be processed at the client device according to any of the example methods according to aspects of the present disclosure to identify an entity associated with a wireless network access point. The regional dataset can include information associated with local establishments as well as regionally common stop-words to be used, for instance, in determining a confidence score for one or more entities as will be discussed in more detail below. The regional dataset can be compressed tightly so that it can be downloaded to a client device at reduced expense of bandwidth and client device storage. The regional dataset can be fetched based at least in part on the location of a user device as determined, for instance, by a positioning system.

At (304), a plurality of candidate entities can be identified based on the estimated location of the wireless network access point. More particularly, the set of entities associated with a geographic location within a defined radius of the estimated location of the wireless network access point in the database of entity information can be identified as the plurality of candidate entities. The radius can be defined as a preset value. In a particular implementation, the radius can be defined based on one or more parameters, such as an uncertainty associated with the estimated location of the wireless network access point, an uncertainty associated the location of the entity in a database of entity information, and an estimated range of the wireless network access point.

Figure 5:
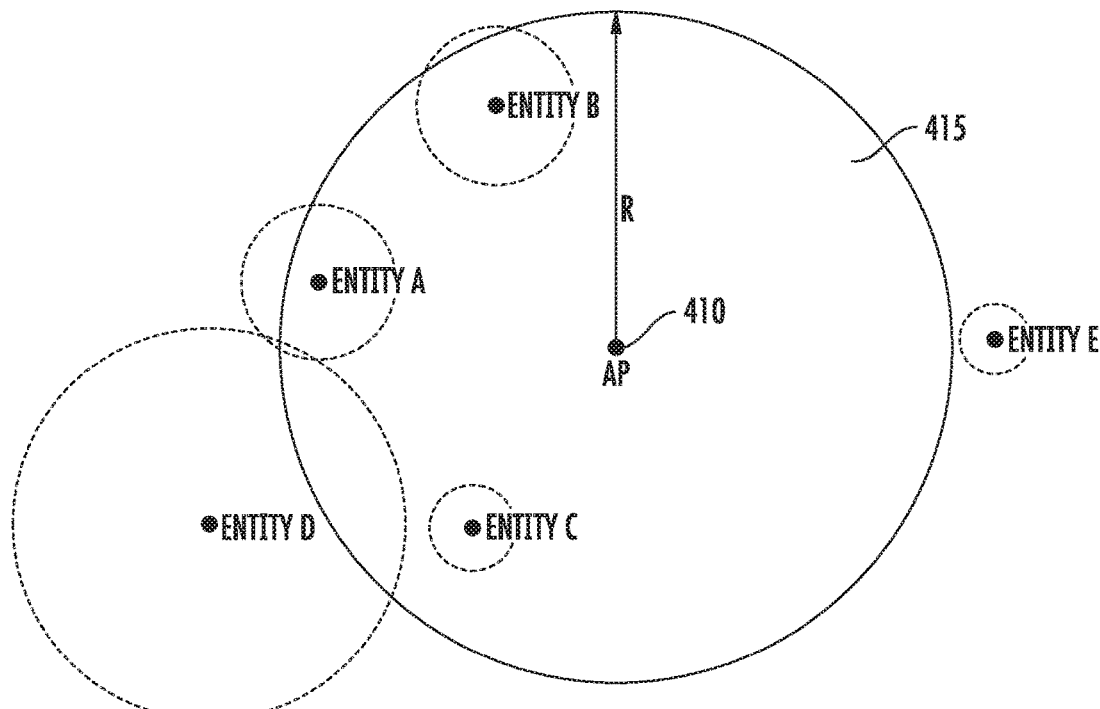
FIG. 5 depicts the example identification of a plurality of candidate entities associated with a wireless network access point according to example embodiments of the present disclosure.

FIG. 5 depicts the example identification of a plurality of candidate entities associated with a wireless network access point according to an example embodiment of the present disclosure. A wireless network access point AP can have an estimated location at 410. The plurality of candidate entities can be identified as the entities in a database of entity information associated with a location that is within a space 415 defined by a radius about the estimated location 410 of the wireless network access point 410. The radius can be determined from several components as follows: radius=X+Y+Z. X can be the uncertainty associated with the estimated location of the wireless network access point (e.g. 1 km). Y can be the uncertainty associated with the location of an entity in the database of entity information (e.g. 200 m). Z can be the estimated maximum distance at which a signal from a wireless network access point can be detected (e.g. 400 m).

For instance, referring to FIG. 5, radius R can be equal to the sum of the uncertainty associated with the estimated location of the wireless network access point and the estimated maximum distance at which a signal from a wireless network access point can be detected. Entity A, entity B, entity C, and entity D can each have an estimated location in a database of entity information (e.g. a geographic information system database). The circles around the respective entities are representative of the varying uncertainties associated with the locations of each entity in the database of entity information. In the example of FIG. 5, entity A, entity B, entity C, and entity D can have a location (taking into account the uncertainty) within the radius R of the estimated location 410 of the wireless network access point. Accordingly, entity A, entity B, entity C, and entity D can be identified as candidate entities. Entity E is not associated with a location within radius R of the estimated location 410 of the wireless network access point. Entity E is not identified as a candidate entity.

Referring back to FIG. 4 at (306), a confidence score can be determined for each identified candidate entity based at least in part on the one or more text signals identified from the network name. The confidence score can be indicative of how likely the entity is associated with the wireless network access point. In example embodiments, the confidence score for each candidate entity can be determined using a scoring function. The scoring function can provide a confidence score for each of the plurality of candidate entities as a function of the one or more text signals.

The scoring function can be configured to provide a confidence score based at least in part on a match between the text signal and name information associated with the entity. The confidence score can be determined, for instance, based on each match of the text signal with one or more aspects of the entity names. Each match can contribute to the confidence score in accordance with a weighting factor assigned to the match. Example matches between text signals and entity name or other entity information are provided as follows: (1) match with the full name of the entity (e.g., the entity name "Café Intermezzo" matched with text signal [cafe intermezzo]); (2) match with individual words in the entity name (e.g., the entity name "Café Intermezzo" matched with the text signal [intermezzo]); (3) match based on word prefixes; (e.g., the entity name "Café Intermezzo" matched with [intermez]); (4) match based on n-grams (e.g. the entity name "Café Intermezzo" matched with [mezz]); (5) match based on initials of the entity name (e.g., the entity name "Walter's Tower of Fun, Inc." matching to the text signal [wtf]); (6) match based on address of the entity (e.g. a library branch at 10 Lincoln Ave matched to the text signal [Lincoln]); and other suitable matches.

Other factors can be considered when matching the one or more text signals to an entity name or information associated with an entity. For instance, terms that appear on a website associated with the entity and are otherwise rare in the corpus of all web pages, or in the corpus of web pages associated with physical entities can be matched with text signals. As an example, the website for an entity can contain the string "Come to our café. We have free Wifi named Fidolicous." The text signal [fidolicous] can be matched to the entity. Network name patterns can also be clustered for multiple branches of the same business. For instance, the network name "Hotel Rewards Wifi" can be associated with multiple branches of the same hotel. A text signal [hotel rewards wife] can be matched with the branch of the hotel located proximate to the estimated location of the wireless network access point, if there is such a branch. Other suitable factors can be considered when matching a text signal with an entity without deviating from the scope of the present disclosure.

According to particular example embodiments of the present disclosure, the contribution of each match to the confidence score can be modified and/or determined based on various factors. For instance, text signals indicative of frequent names (e.g. first or last names, terms frequently occurring in business names such as [inc], [bros], or [cafe]) can be downweighted in determining the confidence score for an entity. As an example, a confidence score determined based on a text signal [John] matched with the entity name "John's Cafe" should be lower than a confidence score determined based on the text signal [brobdingnag] matched with the entity name "Brobdingnag Massage Parlor."

The scoring function can determine and/or modify the confidence score based on a popularity associated with text signals. For instance, regional popularity of text signals can be used to downweight matches with the text signals. As an example, a text signal [bear] near UC Berkeley can be very popular. A match between the text signal [bear] and the entity name "Bear Essentials" should be downweighted.

Text signals associated with local geographic terms can also be downweighted. For instance, the text signal [Springfield] can be fairly common in the town of Springfield, Ill. As a result, matches based on the text signal [Springfield] should be downweighted when matching an wireless network access point located in or near Springfield, Ill., but not when matching a wireless network access point located far away from any town named Springfield.

Global popularity can also be used to determine and/or modify a confidence score associated with an entity. For instance, matches based on common text signals such as [wife], [inc], [llc], can be downweighted. Low entropy signals can also be downweighted. For instance, matches based on text signals with one or two characters (e.g. [at]) can be deemphasized in the determination of the confidence score.

According to additional example aspects of the present disclosure, the scoring function can modify and/or determine the confidence score based at least in part on a distance between the estimated location of the wireless network access point and the location of the candidate entity as determined, for instance, from the database of entity information. A smaller distance between the estimated location of the wireless network access point and the location of the candidate entity can result in a higher confidence score for the entity. The following factors can be considered in determining and/or modifying the confidence score based on this distance: (1) the shortest feasible distance between the location/layout of the entity and the estimated location of the candidate access point; (2) probability distributions of the error in estimates of the geometry of the premises and the estimated location of the wireless network access point; and/or (3) probability distributions for wireless network access point visibility (experimentally derived or theoretical), taking into account, for instance, general information about the nearby location (e.g. urban v. rural or population/building density) or specific information (e.g. the typical absorption of a wireless network access point signal by specific walls expected to be between the wireless network access point and the establishment).

The scoring function can use one or more other signals or factors to determine the confidence score. For example, a user presence signal that is strongly indicative of a user being present at an entity (e.g. a social network check-in) can be used to determine the confidence score for an entity. As another example, the known locations of other wireless network access points and/or the reliable identification of entities associated with other wireless network access points can be used to determine and/or modify a confidence score determined for an entity. For instance, a text signal matched with an entity known to already be associated with a different wireless network access point can be down-weighted in the determination of the confidence score.

Referring to FIG. 4 at (308), the entity associated with the wireless network access point can be identified based on the confidence score determined for each of the plurality of candidate entities. For example, the plurality of candidate entities can be ranked based on the confidence scores determined for each of the plurality of candidate entities. The highest ranked candidate entity can be identified as the entity associated with the wireless network access point. In another implementation, the confidence score for each candidate entity can be compared to a threshold. If the confidence score for a candidate entity exceeds the threshold, the candidate entity can be identified as the entity associated with the wireless network access point.

Referring back to FIG. 3 at (210), once the entity associated with the wireless network access point has been identified, the entity can be output for use by one or more systems or applications. In one particular embodiment, information associated with the entity (e.g. the name of the entity) can be provided for display to a user in a graphical user interface. The user can use the information associated with the identified entity, for instance, to determine whether to connect to a particular wireless network access point.

Figure 6:
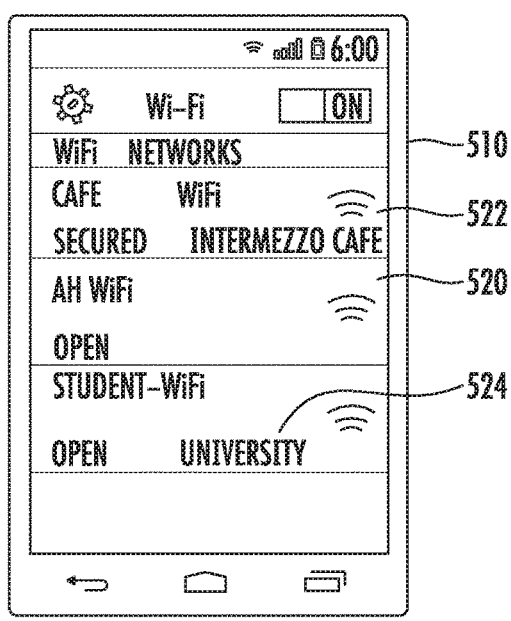
FIG. 6 depicts an example user interface providing a semantic location of an access point according to example embodiments of the present disclosure.

For example, FIG. 6 depicts an example electronic device 510 presenting a graphical user interface 520 on a display. The graphical user interface 520 allows a user to view available wireless network access points for connection by the electronic device. For instance, the graphical user interface 520 presents information associated with three wireless network access points. For each wireless network access point, the graphical user interface 520 can display the network name (e.g. SSID), indicia indicative of signal strength, and information indicative of whether the wireless network access point is a secure or open wireless network access point.

The graphical user interface 520 can also present information associated with an entity identified as associated with a wireless network access point according to example aspects of the present disclosure. For instance, the graphical user interface 520 can display semantic information naming the entity identified as associated with the wireless network access point. In the example graphical user interface 520 of FIG. 6, the semantic entity's name "Intermezzo Café" can be displayed in conjunction with the wireless network access point having a network name Café Wifi as shown at 522 in the graphical user interface 520. The semantic entity name "University" can be displayed in conjunction with the wireless network access point having a network name Student Wifi as shown at 524 in the graphical user interface 520. The semantic information naming the entity can assist the user in picking the wireless network access point with which to connect.

Information identifying the entity associated with the wireless network access point can be used for other purposes. For instance, referring to FIG. 3 at (212), the location of the electronic device can be determined based at least in part on the identified entity. More particularly, a signal can be received indicative of a user device connecting (e.g. through an authentic or other suitable connection) to the wireless network access point associated with the entity. This can be a very reliable signal that the electronic device is located at the entity. Accordingly, the semantic location (e.g. name of the entity) of the user device can be identified from information associated with the entity identified as associated with the wireless network access point.

The reliable signal of electronic device location can be used for a variety of purposes. For instance, the semantic location of the electronic device can be presented to the user in a graphical user interface. The location of the electronic device can be used for one or more location-based services, such as focused search results, travel directions, etc. The reliable signal of electronic device location can also be used to determine information associated with the entity, such as popularity of the entity, trending, repeat visits, peak times, hours of operation, and other characteristics of the entity. The reliable signal of electronic device location can also be used as ground truth data for constructing a model correlating semantic location information with, for instance, electronic device proximity to wireless network access points or other electronic device location signals.

Figure 7:
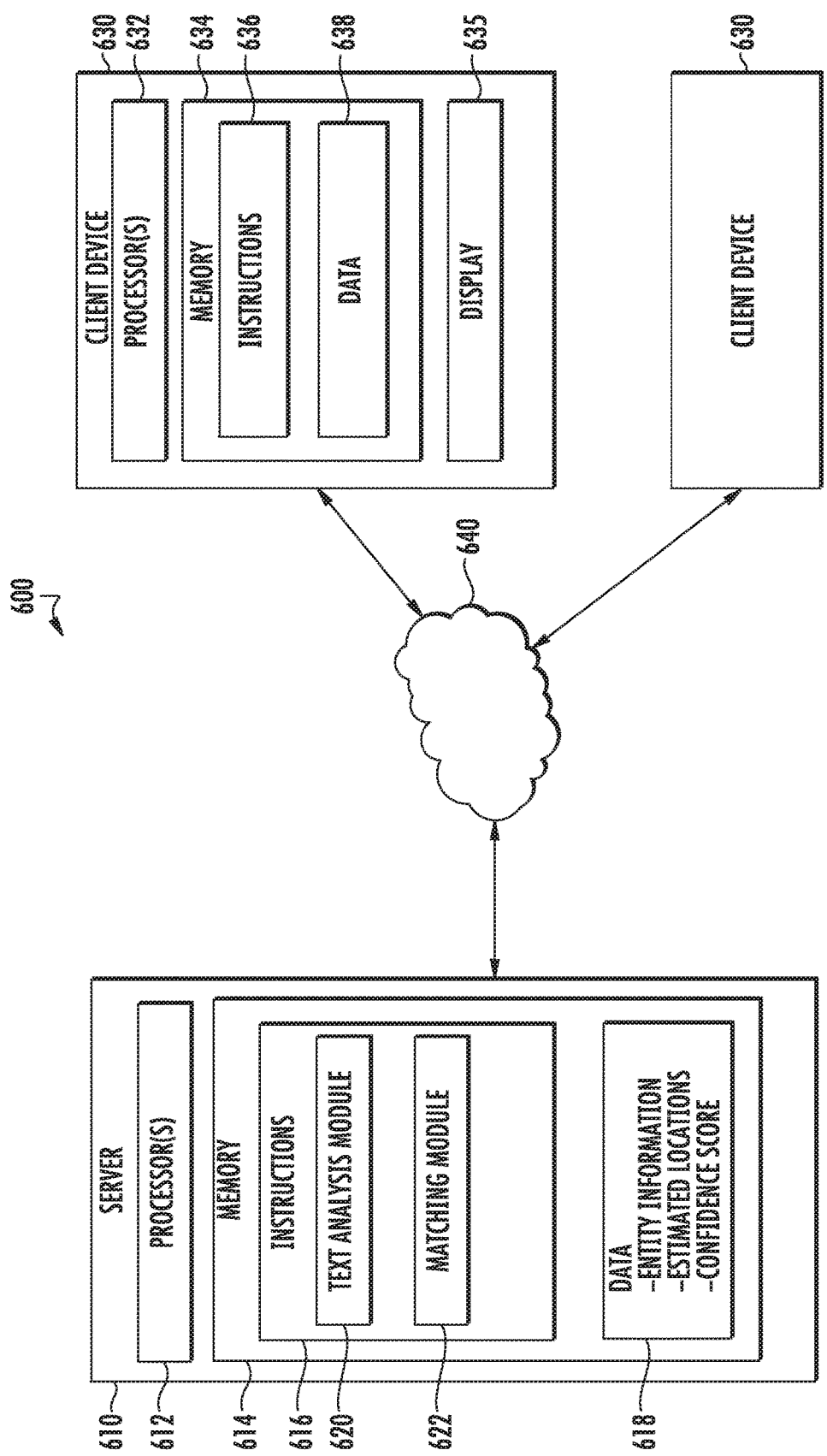
FIG. 7 depicts an example computing systems according to example embodiments of the present disclosure.

Example Computing Systems for Identifying an Entity Associated with a Wireless Network Access Point FIG. 7 depicts a computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can be implemented using any suitable computing device(s). The server 610 can have one or more processors 612 and memory 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The memory 614 can include any one or more computer-readable media, including, but not limited to, non-transitory computer-readable media, RAM, ROM, hard drives, flash drives, or other memory devices. The memory 614 can store information accessible by the one or more processors 612, including computer-readable instructions 616 that can be executed by the one or more processors 612. The instructions 316 can be any set of instructions that when executed by the one or more processors 612, cause the one or more processors 612 to perform operations. For instance, the instructions 616 can be executed by the one or more processors 612 to implement a text analysis module 620 and an entity matching module 622.

The text analysis module 620 can be configured to analyze the network name of the wireless network access point using various text analysis techniques (e.g. tokenization techniques) to identify one or more text signals or tokens from the network name. The entity matching module 622 can be configured to access information such as the estimated location of the access point and other signals to match an entity with the wireless network access point. For instance, the entity matching module 622 can implement the method (300) depicted in FIG. 4. While FIG. 7 depicts the text analysis module 620 and the entity matching module 622 being implemented on server 610, the text analysis module 620 and/or the entity matching module 622 can be implemented on either the server 610 or one or more of the client devices 630.

Memory 614 can also include data 618 that can be retrieved, manipulated, created, or stored by the one or more processors 612. The data 618 can include, for instance, a database of entity information linking entities to geographic locations, estimated locations for wireless network access points, entities matched with wireless network access points, confidence scores, etc. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 7, any number of client devices 630 can be connected to the server 610 over the network 640. Each of the client devices 630 can be any suitable type of computing device, such as a general purpose computer, special purpose computer, laptop, desktop, mobile device, smartphone, tablet, wearable computing device, a display with one or more processors, or other suitable computing device.

Similar to the server 610, a client device 630 can include one or more processor(s) 632 and a memory 634. The one or more processor(s) 632 can include one or more central processing units (CPUs) and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface module configured to present a graphical user interface. The graphical user interface can present information associated with an entity associated with a wireless network access point, such as semantic information naming the entity.

The client device 630 of FIG. 13 can include various input/output devices for providing and receiving information from a user, such as a touch screen, touch pad, data entry keys, speakers, and/or a microphone suitable for voice recognition. For instance, the client device 630 can have a display 635 for presenting geographic imagery of a geographic area to a user.

The client device 630 can further include a positioning system. The positioning system can be any device or circuitry for determining the position of a client device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of identifying an entity associated with a wireless network access point, comprising:

accessing, by one or more processors, an estimated location of a wireless network access point;

accessing, by the one or more processors, a string of characters associated with a service set identifier (SSID) associated with the wireless network access point;

analyzing, by the one or more processors, the SSID to identify at least one text signal, the at least one text signal comprising a set of one or more characters;

identifying, by the one or more processors, an entity associated with the wireless network access point based at least in part on the text signal and the estimated location of the wireless access point; and outputting, by the one or more processors, information associated with the entity;

wherein identifying, by the one or more processors, an entity associated with the wireless network access point based at least in part on the text signal and the estimated location of the wireless access point comprises:

accessing, by the one or more processors, a database of entity information;

identifying, by the one or more processors, a plurality of candidate entities based at least in part on the estimated location of the wireless network access point;

determining, by the one or more processors, a confidence score for each of the plurality of candidate entities based at least in part on the text signal; and identifying, by the one or more processors, at least one of the plurality of candidate entities as the entity associated with the wireless network access point based at least in part on the confidence score;

wherein the confidence score is determined based at least in part on a distance between the estimated location of the wireless network access point and a location of the candidate entity.

2. The computer-implemented method of claim 1, wherein the information associated with the entity comprises semantic information naming the entity.

3. The computer-implemented method of claim 1, wherein the method comprises determining, by the one or more processors, a semantic location of a user device based at least in part on the entity associated with the wireless network access point.

4. The computer-implemented method of claim 3, wherein determining, by the one or more processors, a semantic location of a user device based at least in part on the entity associated with the wireless network access point comprises:

receiving, by the one or more processors, a signal indicative of a user device connection to the wireless network access point; and determining, by the one or more processors, the semantic location of the user device based at least in part on the entity associated with the wireless network access point.

5. The computer-implemented method of claim 4, wherein the connection is an authenticated connection.

6. The computer-implemented method of claim 1, wherein identifying, by the one or more computing devices, a plurality of candidate entities based at least in part on the estimated location of the wireless network access point comprises identifying, by the one or more computing devices, the plurality of candidate entities located within a radius of the estimated location of the wireless network access point.

7. The computer-implemented method of claim 6, wherein the radius is determined as a function of one or more of an uncertainty associated with the estimated location of the wireless network access point, an uncertainty associated with the location of the entity in the database of entity information, and an estimated range of the wireless network access point.

8. The computer-implemented method of claim 6, wherein the confidence score is determined, by the one or more processors, for each of the plurality of candidate entities based at least in part on the text signal using a scoring function, the scoring function providing the confidence score for each of the plurality of candidate entities as a function of the text signal.

9. The computer-implemented method of claim 8, wherein the scoring function is configured to provide the confidence score based at least in part on a match between the text signal and information associated with the entity.

10. The computer-implemented method of claim 8, wherein the scoring function is configured to provide the confidence score based at least in part on a popularity of the text signal.

11. The computer-implemented method of claim 8, wherein the scoring function is configured to provide the confidence score based at least in part on a user presence signal indicative of a user being present at the entity.

12. A computing system, comprising:

one or more processors; and one or more computer-readable media, the one or more computer-readable media storing computer-readable instructions for execution by the one or more processors to cause the one or more processors to perform operations, the operations comprising:

accessing an estimated location of a wireless network access point;

accessing a service set identifier (SSID) associated with the wireless network access point;

analyzing the SSID to identify at least one text signal, the at least one text signal comprising a set of one or more characters;

identifying an entity associated with the wireless network access point based at least in part on the text signal and the estimated location of the wireless access point, the entity identified based at least in part by matching the text signal with information corresponding to the entity associated with the wireless network access point; and outputting information associated with the entity wherein the operation of identifying an entity associated with the wireless network access point based at least in part on the text signal and the estimated location of the wireless access point comprises:

accessing a database of entity information;

identifying a plurality of candidate entities based at least in part on the estimated location of the wireless network access point;

determining a confidence score for each of the plurality of candidate entities based at least in part on the text signal; and identifying at least one of the plurality of candidate entities as the entity associated with the wireless network access point based at least in part on the confidence score;

wherein the confidence score is determined based at least in part on a distance between the estimated location of the wireless network access point and a location of the candidate entity.

13. The computing system of claim 12, wherein the operations further comprise:

receiving a signal indicative of a user device connection to the wireless network access point; and determining a semantic location of the user device based at least in part on the entity associated with the wireless network access point.

14. The computing system of claim 12, wherein the operation of identifying a plurality of candidate entities based at least in part on the estimated location of the wireless network access point comprises identifying the plurality of candidate entities located within a radius of the estimated location of the wireless network access point.

15. The computing system of claim 14, wherein the radius is determined as a function of one or more of an uncertainty associated with the estimated location of the wireless network access point, an uncertainty associated with the location of the entity in the database of entity information, and an estimated range of the wireless network access point.

16. One or more tangible, non-transitory computer-readable media storing computer-readable instructions that when executed by one or more processors cause the one or more processors to perform operations, the operations comprising:
  accessing an estimated location of a wireless network access point;
  accessing a service set identifier (SSID) associated with the wireless network access point;
  analyzing the SSID to identify at least one text signal, the at least one text signal comprising a set of one or more characters;
  identifying an entity associated with the wireless network access point based at least in part on the text signal and the estimated location of the wireless access point, the entity identified based at least in part by matching the text signal with information corresponding to the entity associated with the wireless network access point; and
  outputting information associated with the entity;
  wherein the operation of identifying an entity associated with the wireless network access point based at least in part on the text signal and the estimated location of the wireless access point comprises:
  accessing a database of entity information;
  identifying a plurality of candidate entities based at least in part on the estimated location of the wireless network access point;
  determining a confidence score for each of the plurality of candidate entities based at least in part on the text signal; and
  identifying at least one of the plurality of candidate entities as the entity associated with the wireless network access point based at least in part on the confidence score;
  wherein the confidence score is determined based at least in part on a distance between the estimated location of the wireless network access point and a location of the candidate entity.

* * * * *